US012621901B2

(12) United States Patent
Li

(10) Patent No.: US 12,621,901 B2
(45) Date of Patent: May 5, 2026

(54) METHOD FOR DETERMINING EXTENDED DISCONTINUOUS RECEPTION PARAMETER, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 422 days.

(21) Appl. No.: 18/004,849

(22) PCT Filed: Aug. 20, 2020

(86) PCT No.: PCT/CN2020/110322
§ 371 (c)(1),
(2) Date: Jan. 9, 2023

(87) PCT Pub. No.: WO2022/036649
PCT Pub. Date: Feb. 24, 2022

(65) Prior Publication Data
US 2023/0269819 A1      Aug. 24, 2023

(51) Int. Cl.
*H04W 76/28* (2018.01)
*H04W 68/02* (2009.01)

(52) U.S. Cl.
CPC ........... *H04W 76/28* (2018.02); *H04W 68/02* (2013.01)

(58) Field of Classification Search
CPC .............................. H04W 76/28; H04W 68/02
See application file for complete search history.

(56) References Cited

U.S. PATENT DOCUMENTS

| | | | |
|---|---|---|---|
| 2015/0189590 A1 | 7/2015 | Hu et al. | |
| 2020/0344691 A1* | 10/2020 | Liu | H04W 52/028 |
| 2021/0360731 A1* | 11/2021 | He | H04W 76/27 |
| 2022/0124624 A1* | 4/2022 | Sha | H04W 52/0229 |
| 2022/0225182 A1* | 7/2022 | Tan | H04W 36/0058 |

FOREIGN PATENT DOCUMENTS

| | | |
|---|---|---|
| CN | 110381533 A | 10/2019 |
| CN | 111107594 A | 5/2020 |
| WO | WO 2015065076 A1 | 5/2015 |
| WO | WO 2017173158 A1 | 10/2017 |

(Continued)

OTHER PUBLICATIONS

International Search Report and Written Opinion of International Application No. PCT/CN2020/110322, mailed May 19, 2021, 18 pages.

(Continued)

*Primary Examiner* — Jackie Zuniga Abad
(74) *Attorney, Agent, or Firm* — Finnegan, Henderson, Farabow, Garrett & Dunner, L.L.P.

(57) ABSTRACT

A method for determining an extended discontinuous reception (eDRX) parameter is performed by a first base station, and includes: determining a first target eDRX parameter in an access network for a user equipment (UE) being in an inactive state based on at least one of a first eDRX parameter determined by the first base station or a second eDRX parameter determined by a core network.

18 Claims, 8 Drawing Sheets

(56) References Cited

FOREIGN PATENT DOCUMENTS

| WO | WO 2018063467 A1 | 4/2018 |
| WO | WO 2020154622 A1 | 7/2020 |

OTHER PUBLICATIONS

Samsung; Solution#24 update for eDRX support in RRC-Inactive, 3GPP TSG SA WG2#131, S2-1901952, Feb. 25-Mar. 1, 2019, Santa Cruz, Tenerife, Spain, 3 pages.

Qualcomm Incorporated; Clarify short DRX cycle length CM-CONNECTED with RRC inactive for eMTC; 3GPP TSG-SA WG2 Meeting #134, S2-1907465, Sapporo, Japan, Jun. 24-28, 2019, 5 pages.

European Patent Office, Extended European Search Report issued in Application No. 20949859.1, dated Sep. 21, 2023, 6 pages.

Examination report for India Application No. 202347005136, issued on Sep. 15, 2023, 6 pages.

* cited by examiner

METHOD FOR DETERMINING EXTENDED DISCONTINUOUS RECEPTION PARAMETER, COMMUNICATION DEVICE, AND STORAGE MEDIUM

CROSS-REFERENCE TO RELATED APPLICATION

This application is a U.S. national phase of International Application No. PCT/CN2020/110322, filed on Aug. 20, 2020, the entire content is herein incorporated by reference.

TECHNICAL FIELD

The present application relates to the technical field of wireless communication, but is not limited to the technical field of wireless communication, in particular to a method for determining Extended Discontinuous Reception (eDRX) parameters, a communication device, and a storage medium.

BACKGROUND

3GPP has introduced new power-saving mechanisms for Narrow Band Internet Of Things (NB IOT), which respectively are an Extended Discontinuous Reception (eDRX) mode, a Discontinuous Reception (DRX) mode and a Power Save Mode (PSM).

As shown in FIG. 1, in each eDRX cycle, there is a Paging Time Window (PTW), and the user equipment (UE, User Equipment) monitors the paging channel in the PTW according to the DRX cycle, in order to receive downlink data, and the terminal is in a sleeping state in the rest of the time. Since the duration of the DRX cycle is short, it can be considered that the terminal is always reachable without sleeping.

In the eDRX mode, it can be considered that the terminal device is reachable at any time, but the time delay is relatively large, and the time delay depends on the eDRX cycle, and a balance between low power consumption and time delay can be struck.

SUMMARY

In view of this, the embodiments of the present disclosure provide a method for determining an extended discontinuous reception (eDRX) parameter, a communication device, and a storage medium.

According to a first aspect of the embodiments of the present disclosure, a method for determining an extended discontinuous reception (eDRX) parameter is provided. The method is applied to a first base station and includes:

determining a first target eDRX parameter in an access network for a UE being in an inactive state based on at least one of a first eDRX parameter determined by the first base station or a second eDRX parameter determined by a core network.

According to a second aspect of the embodiments of the present disclosure, a method for determining an extended discontinuous reception (eDRX) parameter is provided. The method is applied to a user equipment (UE) and includes:

determining a second target eDRX parameter in an access network for the UE being in an inactive state based on at least one of a first eDRX parameter determined by a first base station or a second eDRX parameter determined by a core network.

According to a third aspect of the embodiments of the present disclosure, a method for determining an extended discontinuous reception (eDRX) parameter is provided. The method is applied to a second base station and includes:

receiving at least one of a first eDRX parameter determined by a first base station, a second eDRX parameter determined by a core network, or first eDRX auxiliary information determined by a UE, sent by the first base station.

According to a fourth aspect of the embodiments of the present disclosure, a communication device, including a processor, and a memory storing an executable program. The processor is configured to perform the method fix determining an extended discontinuous reception (eDRX) parameter according to the first aspect, the second aspect or the third aspect.

According to an fifth aspect of the embodiments of the present disclosure, a storage medium having an executable program stored thereon is provided. The executable program, when being executed by a processor, implements the method for determining an extended discontinuous reception (eDRX) parameter according to the first aspect, the second aspect or the third aspect.

It is to be understood that both the foregoing general description and the following detailed description are exemplary and explanatory only and are not restrictive of the embodiments of the present disclosure.

BRIEF DESCRIPTION OF THE DRAWINGS

The accompanying drawings here, which are incorporated in the specification and constitute a part of the present specification, illustrate embodiments consistent with the present invention and together with the description serve to explain the principles of the embodiments of the present invention.

DETAILED DESCRIPTION

The exemplary embodiments will now be described in detail here, examples of which are illustrated in the accompanying drawings. When the following description relates to the accompanying drawings, the same numerals in different drawings refer to the same or similar elements unless otherwise indicated. The implementations described in the following exemplary embodiments do not represent all implementations consistent with the embodiments of the present invention. Rather, they are merely examples of apparatuses and methods consistent with aspects of the embodiments of the present invention as recited in the appended claims.

The terminologies used in the embodiments of the present disclosure are for the purpose of describing particular embodiments only, and are not intended to limit the embodiments of the present disclosure. As used in the embodiments of the present disclosure and the appended claims, the singular forms "a", "said", and the are intended to include the plural forms as well, unless the context clearly dictates otherwise. It should also be understood that the term "and/or" as used herein refers to and includes any and all possible combinations of one or more of the associated listed items.

It should be understood that although the terms first, second, third, etc. may be used in the embodiments of the present disclosure to describe various information, these items of information should not be limited to these terms. These terms are only used to distinguish information of the same type from one another. For example, without departing from the scope of the embodiments of the present disclosure, first information may also be referred to as second information, and similarly, second information may also be referred to as first information. Depending on the context, the word "if" as used herein may be interpreted as "upon" or "when" or "in response to determination."

Figure 1:
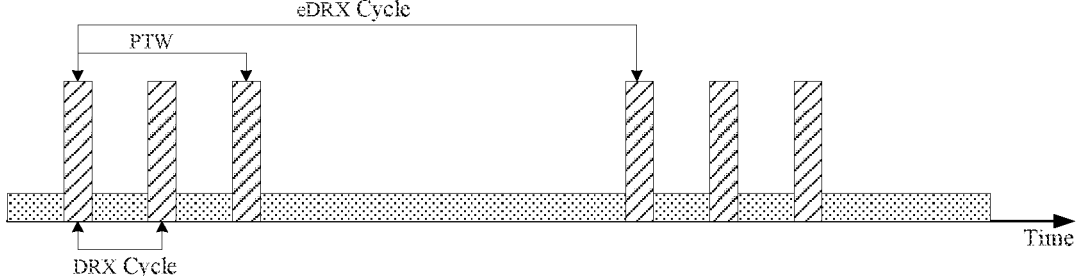
FIG. 1 is a schematic diagram of eDRX timing according to an exemplary embodiment.
Figure 2:
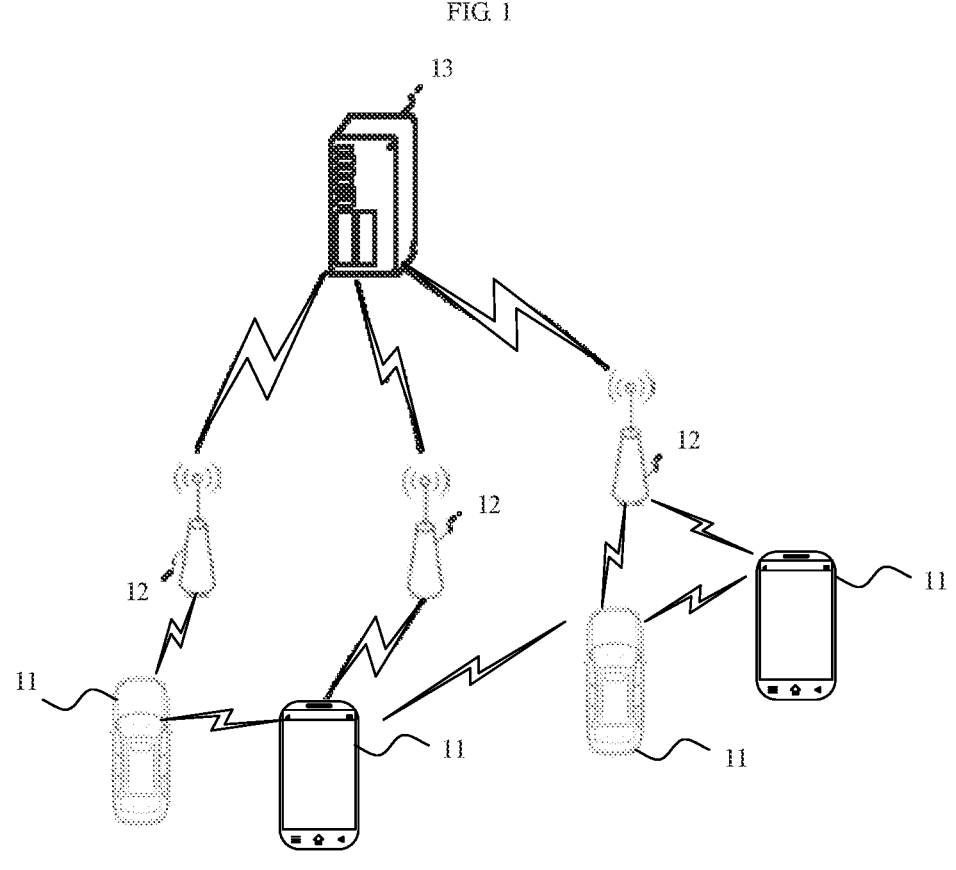
FIG. 2 is a schematic structural diagram of a wireless communication system according to an exemplary embodiment.

Please refer to FIG. 2, which shows a schematic structural diagram of a wireless communication system provided by an embodiment of the present disclosure. As shown in FIG. 2, the wireless communication system is a communication system based on cellular mobile communication technology, and the wireless communication system may include: several terminals 11 and several base stations 12.

The terminals 11 may be devices that provide voice and/or data connectivity to users. The terminals 11 may communicate with one or more core networks via a Radio Access Network (RAN), the terminals 11 may be Internet Of Things terminals, such as sensor devices, mobile phones (or referred to as "cellular" phones) and computers with Internet Of Things terminals, for example, which may be fixed, portable, pocket, hand-held, computer built-in or Vehicle-mounted apparatuses, such as Stations (STA), subscriber units, subscriber stations, mobile stations, mobiles, remote stations, access points, remote terminals, access terminals, user terminals, user agents, user devices, or user equipment (UE). Alternatively, the terminals 11 may also be devices of unmanned aerial vehicles. Alternatively, the terminals 11 may also be vehicle-mounted devices, for example, may be trip computers with wireless communication function, or wireless communication devices connected externally to the trip computers. Alternatively, the terminals 11 may also be roadside devices, for example, may be street lamps, signal lamps, or other roadside devices with wireless communication function, and the like.

The base stations 12 may be network side devices in the wireless communication system. The wireless communication system may be a fourth-generation mobile communication technology (the 4th generation mobile communication, 4G) system, also referred to as a Long-Term Evolution (LTE) system; alternatively, the wireless communication system may also be a 5G system, also referred to as a new air interface (new radio, NR) system or a 5G NR system. Alternatively, the wireless communication system may also be a next-generation system of the 5G system. The access network in the 5G system may be referred to as NG-RAN (New Generation-Radio Access Network). Or the MTC system.

The base stations 12 may be evolved base stations (eNBs) adopted in the 4G system. Alternatively, the base stations 12 may also be base stations (gNBs) adopting a centralized and distributed architecture in the 5G system. When the base station 12 adopts the centralized and distributed architecture, it generally includes a central unit (CU) and at least two distributed units (DU). The central unit is provided with a protocol stack with a Packet Data Convergence Protocol (PDCP) layer, a radio link layer control protocol (Radio Link Control, RLC) layer, a Media Access Control (MAC) layer, the distributed unit is provided with a protocol stack with a Physical (PHY) layer, and the embodiments of the present disclosure do not limit the specific implementation manner of the base stations 12.

A wireless connection can be established between the base station 12 and the terminal 11 through a wireless air interface. In different implementation manners, the wireless air interface is a wireless air interface based on the fourth generation mobile communication network technology (4G) standard; alternatively, the wireless air interface is a wireless air interface based on the fifth generation mobile communication network technology (5G) standard, for example, the wireless air interface is a new air interface; alternatively, the wireless air interface may also be a wireless air interface based on a mobile communication network technical standard of the next-generation of 5G.

In some embodiments, an E2E (End to End) connection may also be established between the terminals 11. For example, for scenarios of V2V (vehicle to vehicle) communication, V2I (vehicle to Infrastructure, vehicle-to-roadside devices) communication, V2P (vehicle to pedestrian) communication in vehicle to everything (V2X) communication, and the like.

In some embodiments, the above wireless communication system may further include a network management device 13.

The several base stations 12 are connected to the network management device 13 respectively. The network management device 13 may be a core network device in the wireless communication system, for example, the network management device 13 may be a Mobility Management Entity (MME) in an Evolved Packet Core (EPC). Alternatively, the network management device may also be other core network devices, such as Serving GateWay (SGW), Public Data Network GateWay (PGW), Policy and Charging Rules Function (PCRF) or Home Subscriber Server (HSS), and the like. The implementation form of the network management device 13 will not be limited by the embodiments of the present disclosure.

Execution subjects involved in the embodiments of the present disclosure include, but are not limited to: UEs such as mobile phone terminals supporting cellular mobile communications, and base stations, and the like.

Figure 3:
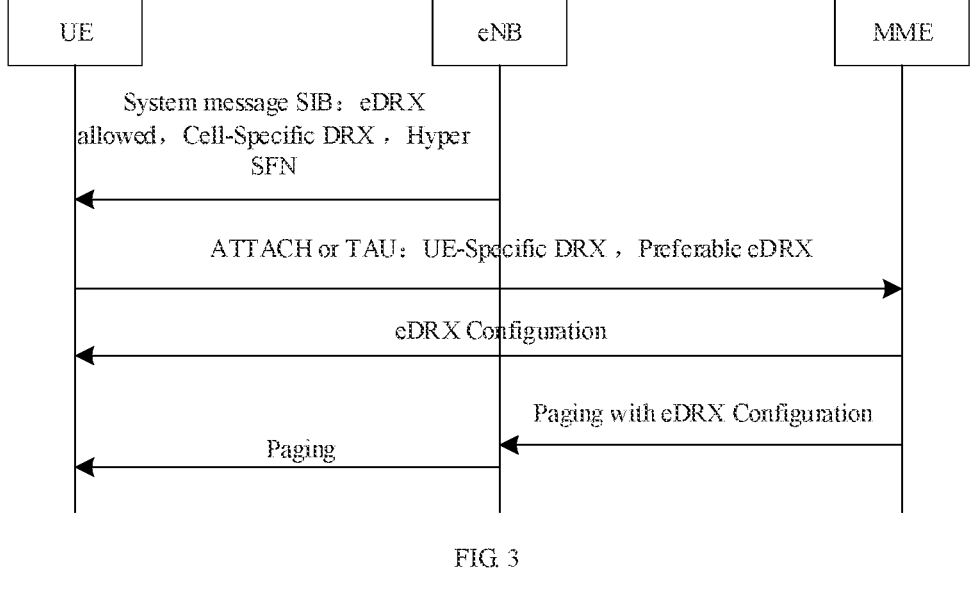
FIG. 3 is a schematic diagram of eDRX information interaction according to an exemplary embodiment.

An application scenario of the embodiments of the present disclosure is that for the eDRX mode, the UE needs to determine the eDRX parameter together with the core network, including: eDRX cycle and PTW duration. The flow of determining the eDRX parameter is as shown in FIG. 3. The negotiation process for determining the eDRX parameter is negotiated between the UE and the core network through a non-access stratum (NAS) message, and the base station is transparent in the negotiation process.

In the NR, an inactive state is introduced. In the inactive state, the UE is in the connected state with regard to the core network. In the inactive state, the UE not only needs to receive paging from the core network, but also needs to accept paging from the Radio Access Network (RAN). If the eDRX mode is used for radio access network paging (RAN paging) in the inactive state, the original negotiation mechanism between the UE and the core network is no longer applicable.

Figure 4:
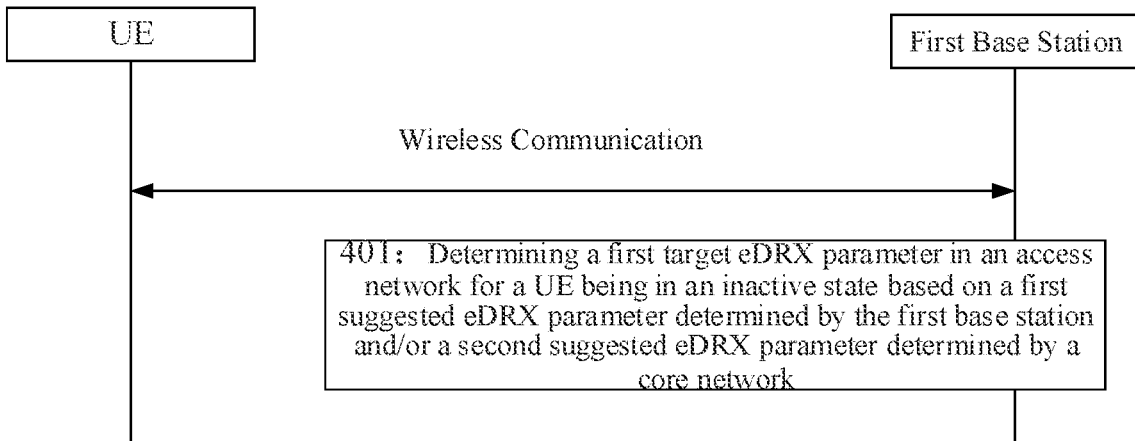
FIG. 4 is a schematic flowchart of a method for determining an extended discontinuous reception (eDRX) parameter according to an exemplary embodiment.

As shown in FIG. 4, the present exemplary embodiment provides a method for determining an extended discontinuous reception (eDRX) parameter. The method for determining an extended discontinuous reception (eDRX) parameter can be applied into a first base station of a cellular mobile communication system, and includes the following.

At block 401: a first target eDRX parameter in an access network for a UE being in an inactive state is determined based on a first suggested eDRX parameter determined by the first base station and/or a second suggested eDRX parameter determined by a core network.

The first base station may include, but is not limited to, a base station in a cellular mobile communication system, and the UE may include, but is not limited, to a UE in a cellular mobile communication system.

The first base station may be the last serving base station before the UE enters the inactive state, and the second base station may be the base station visited by the LIE after leaving the signal coverage area of the first base station.

Here, the inactive state may be the RRC inactive state. In the inactive state, the UE can move within the configured area without notifying the access network, and the core network retains uplink of the UE. Therefore, the core network considers the UE to be in a connected state. When the UE in the inactive state accesses the second base station, the second base station may acquire the context of the first base station through the first base station.

Here, the suggested eDRX parameter may include: a suggested eDRX cycle, a suggested PTW duration, and the like. The target eDRX parameter may include: a target eDRX cycle, a target PTW duration, and the like.

The first suggested eDRX parameter may be a parameter determined by the base station and suggested for the access network (RAN) in the eDRX mode. The second suggested eDRX parameter may be a parameter determined by the core network and suggested for the access network in the eDRX mode. The second suggested eDRX parameter may be the same as or different from the parameter of the core network in the eDRX mode.

The base station and the UE may respectively determine the first target eDRX parameter and the second target eDRX parameter based on the first suggested eDRX parameter and/or the second suggested eDRX parameter.

The first target eDRX parameter and the second target eDRX parameter may be the same as the first suggested eDRX parameter, or may also be the same as the second suggested eDRX parameter, or may also be determined by combining the first suggested eDRX parameter and the second suggested eDRX parameter. The base station and the UE may respectively determine the first target eDRX parameter and the second target eDRX parameter based on the same determination rule. In this way, the base station and the UE can communicate in the eDRX mode based on the same target eDRX parameter.

The first base station may send the first suggested eDRX parameter to the UE when the UE is in a connected state. For example, the first base station may carry the suggested eDRX parameter through dedicated signaling or the like. The core network can send the second suggested eDRX parameter to the UE and the base station.

When the UE enters the inactive state, the UE may monitor paging information and/or enter dormancy and the like based on determination of the second target eDRX parameter. The base station monitors and sends paging information and the like based on determination of the first target eDRX parameter. Thus, eDRX on the access network side is realized.

In this way, a method for determining an eDRX parameter in an access network for a UE being in an inactive state is provided. Radio Access Network paging when the UE is in an inactive state is realized in an eDRX mode, thereby saving the power of the UE.

In one embodiment, determining the first target eDRX parameter in the access network for the UE being in the inactive state based on the first suggested eDRX parameter determined by the first base station and/or the second suggested eDRX parameter determined by the core network includes:

determining the first target eDRX parameter based on the first suggested eDRX parameter and/or the second suggested eDRX parameter and using a determination rule.

The determination rule may indicate the suggested eDRX parameter used by the base station or the UE to determine the target eDRX parameter. For example, the determination rule may indicate that the target eDRX parameter is determined only according to the first suggested eDRX parameter, or indicate that the target eDRX parameter is determined by the base station only according to the second suggested eDRX parameter, or indicate that the target eDRX parameter is determined by the base station only according to the first suggested eDRX parameter and the second suggested eDRX parameter.

The determination rule may also indicate a method for the base station or the UE to determine the target eDRX parameter according to the first suggested eDRX parameter and/or the second suggested eDRX parameter.

Exemplarily, the determination rule may indicate that the base station or the UE determines the smaller value or the larger value of the first suggested eDRX parameter and the second suggested eDRX parameter as the target eDRX parameter. For example, the smaller value of the eDRX cycle in the first suggested eDRX parameter and the eDRX cycle in the second suggested eDRX parameter is determined as the eDRX cycle in the target eDRX parameter; the smaller value of the VFW duration in the first suggested eDRX parameter and the PTW duration in the second suggested eDRX parameter is determined as the PTW duration in the target eDRX parameter.

The determination rules adopted by the base station and the UE may be the same, so that the first target eDRX parameter and the second target eDRX parameter may be the same, so that the base station and the UE can transmit the paging message based on the same eDRX parameter, thereby improving success rate of paging message transmission.

In one embodiment, the method further includes:

sending the determination rule to the UE.

Here, the determination rule may be determined by the base station or the core network, and sent to the UE by the base station. The base station may carry the determination rule in a broadcast message or dedicated signaling and send it to the UE.

In one embodiment, the determination rule is stipulated by a communication protocol, or the determination rule is determined by the first base station.

The determination rule may be stipulated by a communication protocol, and the base station and the UE may use the same determination rule to determine the target eDRX parameter.

The determination rule may also be determined by the network side, such as the first base station, and the base station and the UE may use the same determination rule determined by the network side to determine the target eDRX parameter.

In one embodiment, determining the first target eDRX parameter in the access network for the UE being in the inactive state based on the first suggested eDRX parameter determined by the first base station and/or the second suggested eDRX parameter determined by the core network includes one of the followings:

determining the smaller value of the first suggested eDRX parameter and the second suggested eDRX parameter as the first target eDRX parameter in response to determining the first target eDRX parameter based on the first suggested eDRX parameter and the second suggested eDRX parameter;

determining the first suggested eDRX parameter as the first target eDRX parameter in response to determining the first target eDRX parameter based on the first suggested eDRX parameter;

determining the second suggested eDRX parameter as the first target eDRX parameter in response to determining the first target eDRX parameter based on the second suggested eDRX parameter.

The determination rule may indicate that the base station and the UE determine the target eDRX parameter based on the first suggested eDRX parameter and the second suggested eDRX parameter. And the determination rule may indicate that the smaller value of the first suggested eDRX parameter and the second suggested eDRX parameter may be determined as the first target eDRX parameter and the second target eDRX parameter. For example, the smaller value of the eDRX cycle in the first suggested eDRX parameter and the eDRX cycle in the second suggested eDRX parameter may be determined as the eDRX cycle in the target eDRX parameter; the smaller value of the PTW duration in the first suggested eDRX parameter and the PTV duration in the second suggested eDRX parameter may be determined as the PTW duration in the target eDRX parameter.

The determination rule may indicate that the base station and the UE determine the target eDRX parameter based on the first suggested eDRX parameter or the second suggested eDRX parameter. And the determination rule may indicate that the first suggested eDRX parameter or the second suggested eDRX parameter is determined as the target eDRX parameter between the base station and the UE.

Exemplarily, when the core network does not send the second suggested eDRX parameter, the base station and the UE may respectively determine the first target eDRX parameter and the second target eDRX parameter based on the first suggested eDRX parameter. When the base station does not determine the first suggested eDRX parameter, the base station and the UE may respectively determine the first target eDRX parameter and the second target eDRX parameter based on the second suggested eDRX parameter.

Figure 5:
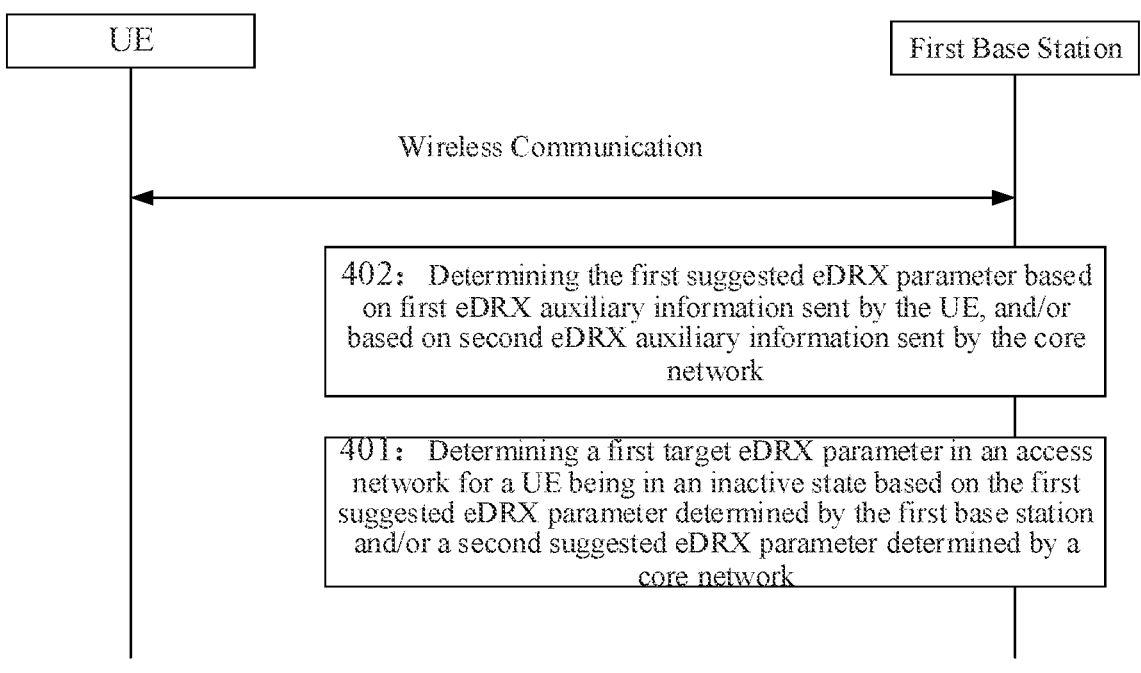
FIG. 5 is a schematic flowchart of another method for determining an extended discontinuous reception (eDRX) parameter according to an exemplary embodiment.

In one embodiment, as shown in FIG. 5, the method further includes the following.

At block 402: the first suggested eDRX parameter is determined based on first eDRX auxiliary information sent by the UE, and/or based on second eDRX auxiliary information sent by the core network.

The first eDRX auxiliary information may be used to indicate whether the UE supports to perform eDRX in the inactive state, and the eDRX parameter that may be supported, and like.

The second eDRX auxiliary information may be used to indicate the existing eDRX parameter of the core network and the like.

The first base station may determine the first suggested eDRX parameter used at the RAN side based on the first eDRX auxiliary information and/or the second eDRX auxiliary information.

In one embodiment, the first eDRX auxiliary information includes at least one of the followings:

indication information indicating whether the UE supports to perform eDRX in the inactive state;

indication information indicating whether the UE allows to perform eDRX in the inactive state;

an auxiliary eDRX parameter of the UE;

an auxiliary parameter determined by the UE for determining a radio access network (RAN) paging cycle.

The first base station may determine whether to determine the first suggested eDRX parameter according to whether the UE supports to perform eDRX in the inactive state and whether it allows to perform eDRX in the inactive state.

The auxiliary eDRX parameter may be the eDRX parameter expected by the UE, and may include expected eDRX cycle and target PTW duration, and the like. The first base station may determine the first suggested eDRX parameter based on the auxiliary eDRX parameter.

The first base station may also determine the RAN paging cycle based on the auxiliary parameter of the RAN paging cycle that the UE expects to use in the inactive state.

In one embodiment, the first eDRX auxiliary information is carried in UE AEEISTANCE INFORMATION signaling.

The UE AEEISTANCE INFORMATION signaling may be sent by the UE to the first base station to indicate status information of the UE, such as: data/service feature information, UE mobility status information, UE expected time delay, and the like.

The UE may carry the first eDRX auxiliary information in the UE AEEISTANCE INFORMATION signaling. The first eDRX auxiliary information may be carried through reserved bits of the UE AEEISTANCE INFORMATION signaling or the like. The UE AEEISTANCE INFORMATION signaling is used to carry the first eDRX auxiliary information, and the information carried by the UE AEEISTANCE INFORMATION signaling is improved, so that utilization efficiency of the UE AEEISTANCE INFORMATION signaling can be improved.

In one embodiment, the second eDRX auxiliary information includes: an auxiliary eDRX parameter of the core network.

The second eDRX auxiliary information may indicate the eDRX parameter adopted by the core network. The first base station may determine the first suggested eDRX parameter based on the eDRX parameter adopted by the core network. The first suggested eDRX parameter may be the same as or may also be different from the auxiliary eDRX parameter of the core network.

In one embodiment, the second eDRX auxiliary information is carried in a UE CONTEXT SETUP message for setting up a user equipment context.

The UE CONTEXT SETUP is used for the core network to send the context of the UE to the first base station. The core network may carry the second eDRX auxiliary information in the UE CONTEXT SETUP signaling. The second eDRX auxiliary information may be carried through reserved bits of the UE CONTEXT SETUP signaling or the like. The UE CONTEXT SETUP signaling is used to carry the second eDRX auxiliary information, and the information carried by the UE CONTEXT SETUP signaling is improved, so that utilization efficiency of the UE CONTEXT SETUP signaling can be improved.

In one embodiment, the method further includes:
sending the first suggested eDRX parameter to the UE, the first suggested eDRX parameter is used for the UE to determine a second target eDRX parameter for the UE accessing the access network in the inactive state.

After determining the first suggested eDRX parameter, the base station may send the first suggested eDRX parameter to the UE for the UE to determine the second target eDRX parameter.

In one embodiment, the first target eDRX parameter is the same as the second target eDRX parameter.

When the base station and the UE respectively determine the first target eDRX parameter and the second target eDRX parameter using the same determination rule, the first target eDRX parameter and the second target eDRX parameter may be the same, so that the base station and the UE can transmit the paging message based on the same eDRX parameter, thereby improving success rate of paging message transmission.

In one embodiment, the sending the first suggested eDRX parameter to the UE includes:
sending RRC CONNECTION RELEASE signaling carrying the first suggested eDRX parameter to the UE.

When the UE switches from the connected state to the inactive state or the idle state, the first base station may send the RRC CONNECTION RELEASE signaling to the UE to release the RRC connection of the UE.

The first base station may carry the first suggested eDRX parameter in the RRC CONNECTION RELEASE signaling. The UE is caused to acquire the first suggested eDRX parameter before entering the inactive state, and then determine the target eDRX parameter used in the inactive state.

The RRC CONNECTION RELEASE signaling is used to carry the first suggested eDRX parameter, and the information carried in the RRC CONNECTION RELEASE signaling is improved, so that utilization efficiency of the RRC CONNECTION RELEASE signaling can be improved.

In one embodiment, the method further includes:
sending the first suggested eDRX parameter, and/or the second suggested eDRX parameter determined by the core network, and/or the first eDRX auxiliary information sent by the UE to a second base station.

When the UE changes from the second base station to the second base station, the second base station also needs to determine the third target eDRX parameter of the UE on the side of the RAN in the inactive state. Because the UE may be in the inactive state, the first base station may send relevant information for determining the third target eDRX parameter to the second base station.

The first base station may send the first suggested eDRX parameter, and/or the second suggested eDRX parameter determined by the core network, and/or the first eDRX auxiliary information sent by the UE to a second base station, in response to request information.

The first base station may, based on the stipulations of the communication protocol, when the UE changes the base station, send the first suggested eDRX parameter, and/or the second suggested eDRX parameter determined by the core network, and/or the first eDRX auxiliary information sent by the UE to a second base station.

The manner in which the second base station determines the third target eDRX parameter is similar to that of the first base station, and will not be repeated here.

In one embodiment, the method further includes:
receiving request information for requesting the first suggested eDRX parameter, and/or the second suggested eDRX parameter, and/or the first eDRX auxiliary information, which is sent by the second base station.

Sending the first suggested eDRX parameter, and/or the second suggested eDRX parameter, and/or the first eDRX auxiliary information to the second base station includes:
sending the first suggested eDRX parameter, and/or the second suggested eDRX parameter, and/or the first eDRX auxiliary information to the second base station in response to receiving the request information.

When the UE changes from the first base station to the second base station, the second base station may send the request information. The changing of the UE from the first base station to the second base station may include: switching the UE from the first base station to the second base station, reselecting of the UE from the first base station to the second base station, and movement of the UE from the signal coverage area of the first base station to the signal coverage area of the second base station in the inactive state, and the like.

The first base station may, based on the stipulations of the communication protocol, when the UE changes the base station, send the first suggested eDRX parameter, and/or the second suggested eDRX parameter determined by the core network, and/or the first eDRX auxiliary information sent by the UE to the second base station.

In one embodiment, receiving the request information for requesting the first suggested eDRX parameter, axed/or the second suggested eDRX parameter, and/or the first eDRX auxiliary information, which is sent by the second base station includes:
receiving RETRIEVE UE CONTEXT REQUEST signaling carrying the request information.

When the UE changes from the first base station to the second base station, the second base station can initiate UE uplink acquisition process, the second base station may send RETRIEVE UE CONTEXT REQUEST signaling to the first base station, to requesting UE context.

The second base station may carry the request information in the RETRIEVE UE CONTEXT REQUEST signaling.

Exemplarily, the request information may be indicated using one bit. For example, "1" may be used to indicate the request information for requesting the first suggested eDRX parameter, and/or the second suggested eDRX parameter, and/or the first eDRX auxiliary information. Or "0" may also be used to indicate the request information for requesting the first suggested eDRX parameter, and/or the second suggested eDRX parameter, and/or the first eDRX auxiliary information.

In one embodiment, sending the first suggested eDRX parameter, and/or the second suggested eDRX parameter, and/or the first eDRX auxiliary information to the second base station includes:

sending RETRIEVE UE CONTEXT RESPONSE signaling carrying the first suggested eDRX parameter, and/or the second suggested eDRX parameter, and/or the first eDRX auxiliary information to the second base station.

The first base station may, in response to the request information in the RETRIEVE UE CONTEXT RESPONSE signaling, send the RETRIEVE UE CONTEXT RESPONSE signaling carrying the first suggested eDRX parameter, and/or the second suggested eDRX parameter, and/or the first eDRX auxiliary information to the second base station.

The first base station may also, based on the stipulations of the communication protocol, when sending the RETRIEVE UE CONTEXT RESPONSE signaling, send the RETRIEVE UE CONTEXT RESPONSE signaling carrying the first suggested eDRX parameter, and/or the second suggested eDRX parameter, and/or the first eDRX auxiliary information to the second base station.

The suggested eDRX parameter and/or the target eDRX parameter may be carried through reserved bits of the RETRIEVE UE CONTEXT RESPONSE signaling.

By using the RETRIEVE UE CONTEXT RESPONSE signaling to carry the suggested eDRX parameter and/or the target eDRX parameter, the information carried in the RETRIEVE UE CONTEXT RESPONSE signaling is improved, so that utilization efficiency of the RETRIEVE UE CONTEXT RESPONSE signaling can be improved.

In one embodiment, one information element may be newly added in the RETRIEVE UE CONTEXT RESPONSE signaling to carry the first suggested eDRX parameter, and/or the second suggested eDRX parameter, and/or the first eDRX auxiliary information.

In one embodiment, sending the first suggested eDRX parameter, and/or the second suggested eDRX parameter, and/or the first eDRX auxiliary information to the second base station includes:

sending RAN PAGING signaling carrying the first suggested eDRX parameter, and/or the second suggested eDRX parameter, and/or the first eDRX auxiliary information to the second base station.

When the core network pages the UE through the first base station, if the UE has changed to the second base station, the first base station can forward the paging message to the second base station through the inter-base station message: RAN PAGING signaling, and the UE will be paged by the second base station. The first suggested eDRX parameter, and/or the second suggested eDRX parameter, and/or the first eDRX auxiliary information may be carried in the RAN PAGING signaling. In this way, usage efficiency of the RAN PAGING signaling can be improved.

In one embodiment, the RAN PAGING signaling includes a first information element and a second information element, the first information element carries the first suggested eDRX parameter, and/or the second suggested eDRX parameter, and/or the first eDRX auxiliary information, and the second information element carries paging information for paging the UE;

or the first suggested eDRX parameter, and/or the second suggested eDRX parameter, and/or the first eDRX auxiliary information are carried in a UE-RadioPagingInfo information element of the RAN PAGING signaling.

The RAN PAGING signaling is used to carry the paging information of the UE. An information element may be newly added in the RAN PAGING signaling, to carry the first suggested eDRX parameter, and/or the second suggested eDRX parameter, and/or the first eDRX auxiliary information.

The first suggested eDRX parameter, and/or the second suggested eDRX parameter, and/or the first eDRX auxiliary information may also be carried in a UE-RadioPagingInfo information element of the RAN PAGING signaling.

Figure 6:
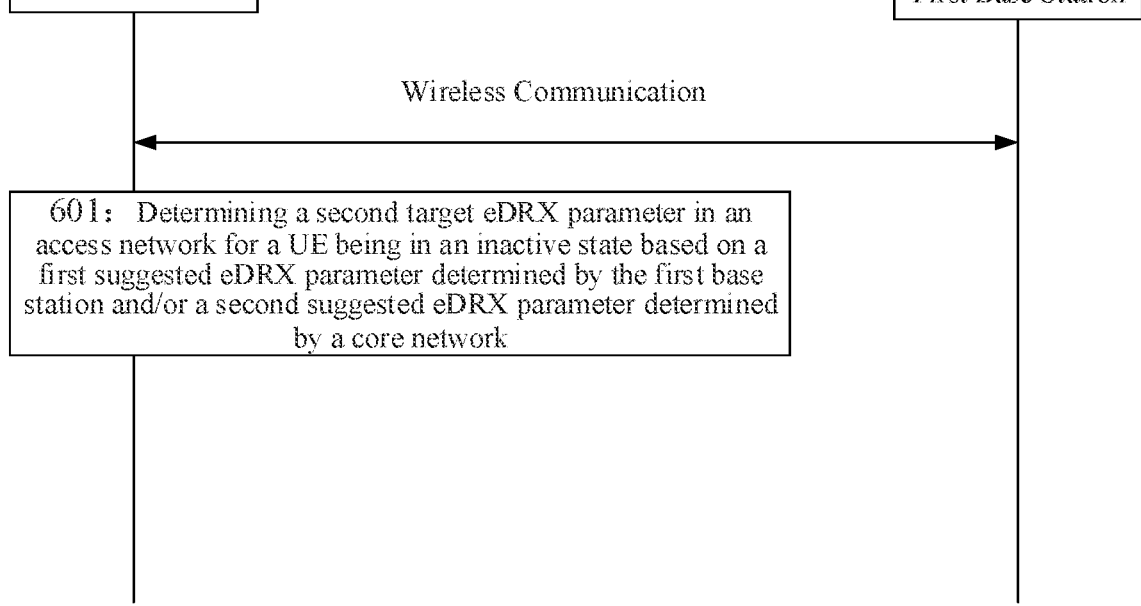
FIG. 6 is a schematic flowchart of yet another method for determining an extended discontinuous reception (eDRX) parameter according to an exemplary embodiment.

As shown in FIG. 6, the present exemplary embodiment provides a method for determining an extended discontinuous reception (eDRX) parameter. The method for determining an extended discontinuous reception (eDRX) parameter can be applied into a User Equipment UE of a cellular mobile communication system, and includes the following.

At block 601: a second target eDRX parameter in an access network for a UE being in an inactive state is determined based on a first suggested eDRX parameter determined by the first base station and/or a second suggested eDRX parameter determined by a core network.

The first base station may include, but is not limited to, a base station in a cellular mobile communication system, and the UE may include, but is not limited, to a UE in a cellular mobile communication system.

The first base station may be the last serving base station before the UE enters the inactive state, and the second base station may be the base station visited by the UE after leaving the signal coverage area of the first base station.

Here, the inactive state may be the RRC inactive state. In the inactive state, the UE can move within the configured area without notifying the access network, and the core network retains uplink of the UE. Therefore, the core network considers the UE to be in a connected state. When the UE in the inactive state accesses the second base station, the second base station may acquire the context of the first base station through the first base station.

Here, the suggested eDRX parameter may include: a suggested eDRX cycle, a suggested PTW duration, and the like. The target eDRX parameter may include: a target eDRX cycle, a target PTW duration, and the like.

The first suggested eDRX parameter may be a parameter determined by the base station and suggested for the eDRX mode of the access network (RAN). The second suggested eDRX parameter may be a parameter determined by the core network and suggested for the eDRX mode of the access network. The second suggested eDRX parameter may be the same as or different from the parameter of the core network eDRX mode.

The base station and the UE may respectively determine the first target eDRX parameter and the second target eDRX parameter based on the first suggested eDRX parameter and/or the second suggested eDRX parameter.

The first target eDRX parameter and the second target eDRX parameter may be the same as the first suggested eDRX parameter, or may also be the same as the second suggested eDRX parameter, or may also be determined by combining the first suggested eDRX parameter and the second suggested eDRX parameter. The base station and the UE may respectively determine the first target eDRX parameter and the second target eDRX parameter based on the same determination rule. In this way, the base station and the UE can communicate in the eDRX mode based on the same target eDRX parameter.

The first base station may send the first suggested eDRX parameter to the UE when the UE is in a connected state. For example, the first base station may carry the suggested eDRX parameter through dedicated signaling or the like. The core network can send the second suggested eDRX parameter to the UE and the base station.

When the UE enters the inactive state, the UE may monitor paging information and/or enter dormancy and the like based on determination of the second target eDRX parameter. The base station monitors and sends paging information and the like based on determination of the first target eDRX parameter. Thus, eDRX on the access network side is realized.

In this way, a method for determining an eDRX parameter in an access network for a UE being in an inactive state is provided. Radio Access Network paging when the UE is in an inactive state is realized in an eDRX mode, thereby saving power of the UE.

In one embodiment, determining the second target eDRX parameter in the access network for the UE being in the inactive state based on the first suggested eDRX parameter determined by the base station and/or the second suggested eDRX parameter determined by the core network includes:

determining the second target eDRX parameter based on the first suggested eDRX and/or the second suggested eDRX parameter and using a determination rule.

The determination rule may indicate the suggested eDRX parameter used by the base station or the UE to determine the target eDRX parameter. For example, the determination rule may indicate that the target eDRX parameter is determined only according to the first suggested eDRX parameter, or indicate that the target eDRX parameter is determined by the base station only according to the second suggested eDRX parameter, or indicate that the target eDRX parameter is determined by the base station only according to the first suggested eDRX parameter and the second suggested eDRX parameter.

The determination rule may also indicate a method for the base station or the UE to determine the target eDRX parameter according to the first suggested eDRX parameter and/or the second suggested eDRX parameter.

Exemplarily, the determination rule may indicate that the base station or the UE determines the smaller value or the larger value of the first suggested eDRX parameter and the second suggested eDRX parameter as the target eDRX parameter. For example, the smaller value of the eDRX cycle in the first suggested eDRX parameter and the eDRX cycle in the second suggested eDRX parameter is determined as the eDRX cycle in the target eDRX parameter; the smaller value of the PTW duration in the first suggested eDRX parameter and the PTW duration in the second suggested eDRX parameter is determined as the PTW duration in the target eDRX parameter.

The determination rules adopted by the base station and the UE may be the same, so that the first target eDRX parameter and the second target eDRX parameter may be the same, so that the base station and the UE can transmit the paging message based on the same eDRX parameter, thereby improving success rate of paging message transmission.

In one embodiment, the method further includes:

receiving the determination rule sent by the base station. Here, the determination rule may be determined by the base station or the core network, and sent to the UE by the base station. The base station may carry the determination rule in a broadcast message or dedicated signaling and send it to the UE.

In one embodiment, the determination rule is stipulated by a communication protocol, or
the determination rule is determined by the first base station.

The determination rule may be stipulated by a communication protocol, and the base station and the UE may use the same determination rule to determine the target eDRX parameter.

The determination rule may also be determined by the network side, such as the first base station, and the base station and the UE may use the same determination rule determined by the network side to determine the target eDRX parameter.

In one embodiment, determining the second target eDRX parameter in the access network for the UE being in the inactive state based on the first suggested eDRX parameter determined by the base station and/or the second suggested eDRX parameter determined by the core network includes one of the followings:

determining the smaller value of the first suggested eDRX parameter and the second suggested eDRX parameter as the second target eDRX parameter in response to determining the second target eDRX parameter based on the first suggested eDRX parameter and the second suggested eDRX parameter;

determining the first suggested eDRX parameter as the second target eDRX parameter in response to determining the second target eDRX parameter based on the first suggested eDRX parameter;

determining the second suggested eDRX parameter as the second target eDRX parameter in response to determining the second target eDRX parameter based on the second suggested eDRX parameter.

The determination rule may indicate that the base station and the UE determine the target eDRX parameter based on the first suggested eDRX parameter and the second suggested eDRX parameter. And the determination rule may indicate that the smaller value of the first suggested eDRX parameter and the second suggested eDRX parameter may be determined as the first target eDRX parameter and the second target eDRX parameter. For example, the smaller value of the eDRX cycle in the first suggested eDRX parameter and the eDRX cycle in the second suggested eDRX parameter may be determined as the eDRX cycle in the target eDRX parameter; the smaller value of the PTW duration in the first suggested eDRX parameter and the PTW duration in the second suggested eDRX parameter may be determined as the PTW duration in the target eDRX parameter.

The determination rule may indicate that the base station and the UE determine the target eDRX parameter based on the first suggested eDRX parameter or the second suggested eDRX parameter. And the determination rule may indicate that the first suggested eDRX parameter or the second suggested eDRX parameter is determined as the target eDRX parameter between the base station and the UE.

Exemplarily, when the core network does not send the second suggested eDRX parameter, the base station and the UE may respectively determine the first target eDRX parameter and the second target eDRX parameter based on the first suggested eDRX parameter. When the base station does not determine the first suggested eDRX parameter, the base station and the UE may respectively determine the first target eDRX parameter and the second target eDRX parameter based on the second suggested eDRX parameter.

Figure 7:
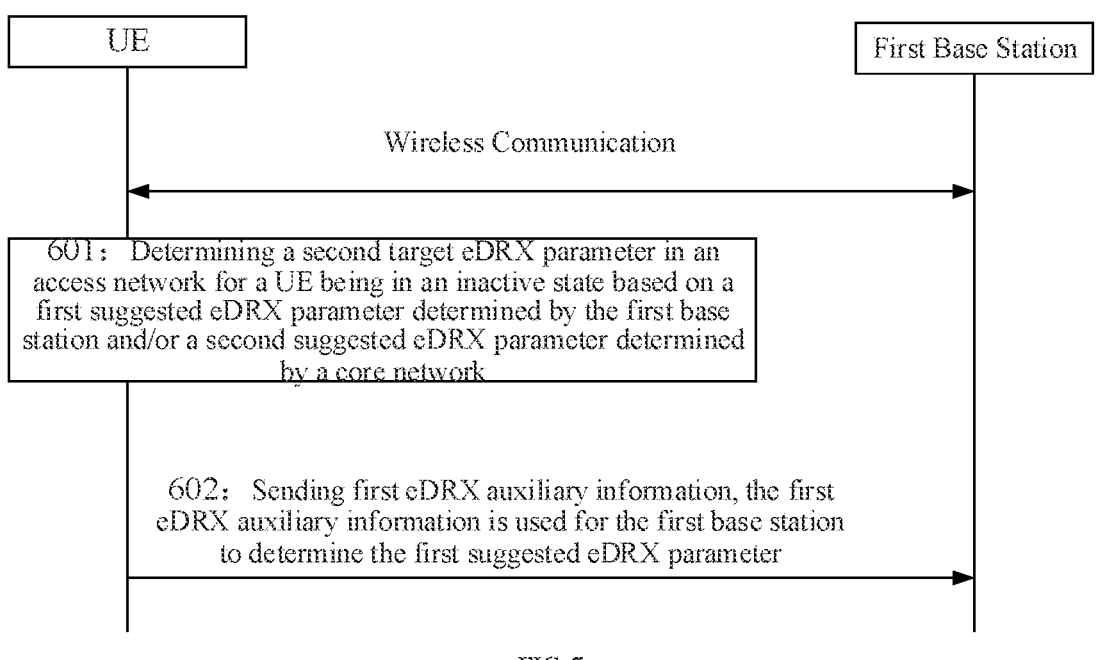
FIG. 7 is a schematic flowchart of still another method for determining an extended discontinuous reception (eDRX) parameter according to an exemplary embodiment.

In one embodiment, as shown in FIG. 7, the method further includes the following.

At block 602: first eDRX auxiliary information is sent, the first eDRX auxiliary information is used for the first base station to determine the first suggested eDRX parameter.

The first eDRX auxiliary information may be used to indicate whether the UE supports to perform eDRX in the inactive state, and the eDRX parameter that may be supported, and like.

The second eDRX auxiliary information may be used to indicate the existing eDRX parameter of the core network and the like.

The first base station may determine the first suggested eDRX parameter used at the RAN side based on the first eDRX auxiliary information and/or the second eDRX auxiliary information.

In one embodiment, the first eDRX auxiliary information includes at least one of the followings:

indication information indicating whether the UE supports to perform eDRX in the inactive state;

indication information indicating whether the UE allows to perform eDRX in the inactive state;

an auxiliary eDRX parameter of the UE;

an auxiliary parameter determined by the UE for determining a radio access network (RAN) paging cycle.

The first base station may determine whether to determine the first suggested eDRX parameter according to whether the UE supports to perform eDRX in the inactive state and whether it allows to perform eDRX in the inactive state.

The auxiliary eDRX parameter may be the eDRX parameter expected by the UE, and may include expected eDRX cycle and target PTW duration, and the like. The first base station may determine the first suggested eDRX parameter based on the auxiliary eDRX parameter.

The first base station may also determine the RAN paging cycle based on the auxiliary parameter of the RAN paging cycle that the UE expects to use in the inactive state.

In one embodiment, the method further includes:

receiving the first suggested eDRX parameter sent by the first base station.

After determining the first suggested eDRX parameter, the base station may send the first suggested eDRX parameter to the UE for the UE to determine the second target eDRX parameter.

In one embodiment, the receiving the first suggested eDRX parameter sent by the first base station includes:

receiving RRC CONNECTION RELEASE signaling carrying the first suggested eDRX parameter to the UE.

When the UE switches from the connected state to the inactive state or the idle state, the first base station may send the RRC CONNECTION RELEASE signaling to the UE to release the RRC connection of the UE.

The first base station may carry the first suggested eDRX parameter in the RRC CONNECTION RELEASE signaling. The UE is caused to acquire the first suggested eDRX parameter before entering the inactive state, and then determine the target eDRX parameter used in the inactive state.

The RRC CONNECTION RELEASE signaling is used to carry the first suggested eDRX parameter, and the information carried in the RRC CONNECTION RELEASE signaling is improved, so that utilization efficiency of the RRC CONNECTION RELEASE signaling can be improved.

Figure 8:
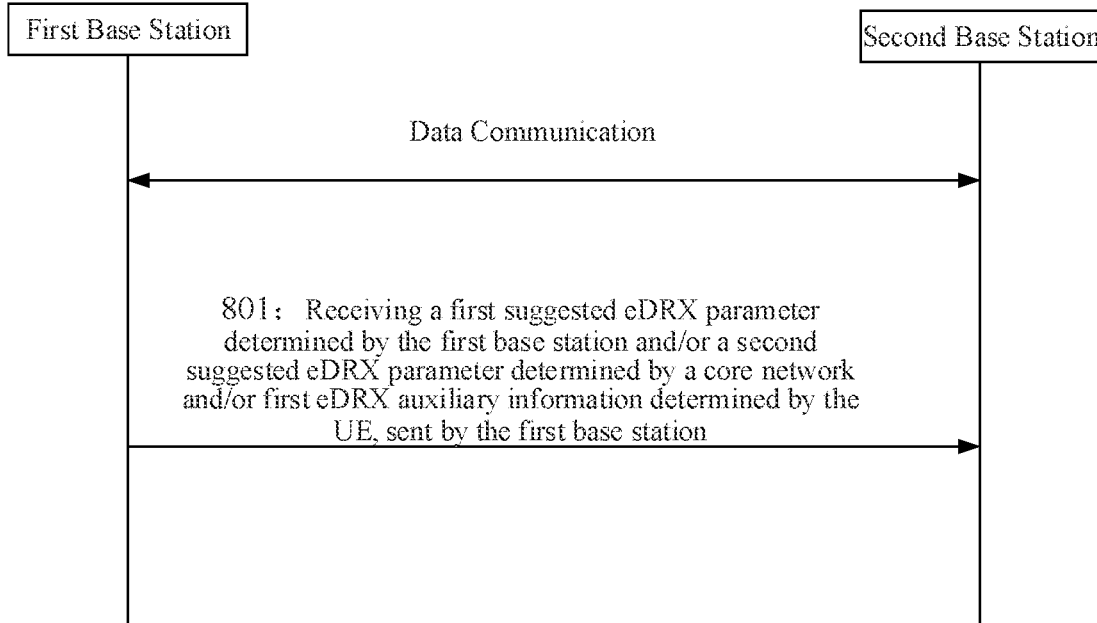
FIG. 8 is a schematic flowchart of still another method for determining an extended discontinuous reception (eDRX) parameter according to an exemplary embodiment.

As shown in FIG. 8, the present exemplary embodiment provides a method for determining an extended discontinuous reception (eDRX) parameter. The method for determining an extended discontinuous reception (eDRX) parameter can be applied into a second base station of a cellular mobile communication system, and includes the following.

At block 801: a first suggested eDRX parameter determined by the first base station and/or a second suggested eDRX parameter determined by a core network and/or the first eDRX auxiliary information determined by the UE, sent by the first base station, are received.

The first base station may include, but is not limited to, a base station in a cellular mobile communication system, and the UE may include, but is not limited, to a UE in a cellular mobile communication system.

The first base station may be the last serving base station before the UE enters the inactive state, and the second base station may be the base station visited by the UE after leaving the signal coverage area of the first base station.

Here, the inactive state may be the RRC inactive state. In the inactive state, the UE can move within the configured area without notifying the access network, and the core network retains uplink of the UE. Therefore, the core network considers the UE to be in a connected state. When the UE in the inactive state accesses the second base station, the second base station may acquire the context of the first base station through the first base station.

Here, the suggested eDRX parameter may include: a suggested eDRX cycle, a suggested PTW duration, and the like. The target eDRX parameter may include: a target eDRX cycle, a target PTW duration, and the like.

The first suggested eDRX parameter may be a parameter determined by the base station and suggested for the eDRX mode of the access network (RAN). The second suggested eDRX parameter may be a parameter determined by the core network and suggested for the eDRX mode of the access network. The second suggested eDRX parameter may be the same as or different from the parameter of the core network eDRX mode.

The base station and the UE may respectively determine the first target eDRX parameter and the second target eDRX parameter based on the first suggested eDRX parameter and/or the second suggested eDRX parameter.

The first target eDRX parameter and the second target eDRX parameter may be the same as the first suggested eDRX parameter, or may also be the same as the second suggested eDRX parameter, or may also be determined by combining the first suggested eDRX parameter and the second suggested eDRX parameter. The base station and the UE may respectively determine the first target eDRX parameter and the second target eDRX parameter based on the same determination rule. In this way, the base station and the UE can communicate in the eDRX mode based on the same target eDRX parameter.

The first base station may send the first suggested eDRX parameter to the UE when the UE is in a connected state. For example, the first base station may carry the suggested eDRX parameter through dedicated signaling or the like. The core network can send the second suggested eDRX parameter to the UE and the base station.

When the UE enters the inactive state, the UE may monitor paging information and/or enter dormancy and the like based on determination of the second target eDRX parameter. The base station monitors and sends paging information and the like based on determination of the first target eDRX parameter. Thus, eDRX on the access network side is realized.

The first eDRX auxiliary information may be used to indicate whether the UE supports to perform eDRX in the inactive state, and the eDRX parameter that may be supported, and like.

The second eDRX auxiliary information may be used to indicate the existing eDRX parameter of the core network and the like.

The first base station may determine the first suggested eDRX parameter used at the RAN side based on the first eDRX auxiliary information and/or the second eDRX auxiliary information.

In one embodiment, the first eDRX auxiliary information includes at least one of the following:

indication information indicating whether the UE supports to perform eDRX in the inactive state;

indication information indicating whether the UE allows to perform eDRX in the inactive state;

an auxiliary eDRX parameter of the UE;

an auxiliary parameter determined by the UE for determining a radio access network (RAN) paging cycle.

The first base station may determine whether to determine the first suggested eDRX parameter according to whether the UE supports to perform eDRX in the inactive state and whether it allows to perform eDRX in the inactive state.

The auxiliary eDRX parameter may be the eDRX parameter expected by the UE, and may include expected eDRX cycle and target PTW duration, and the like. The first base station may determine the first suggested eDRX parameter based on the auxiliary eDRX parameter.

The first base station may also determine the RAN paging cycle based on the auxiliary parameter of the RAN paging cycle that the UE expects to use in the inactive state.

When the UE changes from the second base station to the second base station, the second base station also needs to determine the third target eDRX parameter of the UE on the side of the RAN in the inactive state. Because the UE may be in the inactive state, the first base station may send relevant information for determining the third target eDRX parameter to the second base station.

The first base station may send the first suggested eDRX parameter, and/or the second suggested eDRX parameter determined by the core network, and/or the first eDRX auxiliary information sent by the UE, to a second base station, in response to request information.

The first base station may, based on the stipulations of the communication protocol, when the UE changes the base station, send the first suggested eDRX parameter, and/or the second suggested eDRX parameter determined by the core network, and/or the first eDRX auxiliary information sent by the UE to a second base station.

The manner in which the second base station determines the third target eDRX parameter is similar to that of the first base station, and will not be repeated here.

In this way, a method for determining an eDRX parameter in an access network for a UE being in an inactive state is provided. Radio Access Network paging when the UE is in an inactive state is realized in an eDRX mode, thereby saving the power of the UE.

Figure 9:
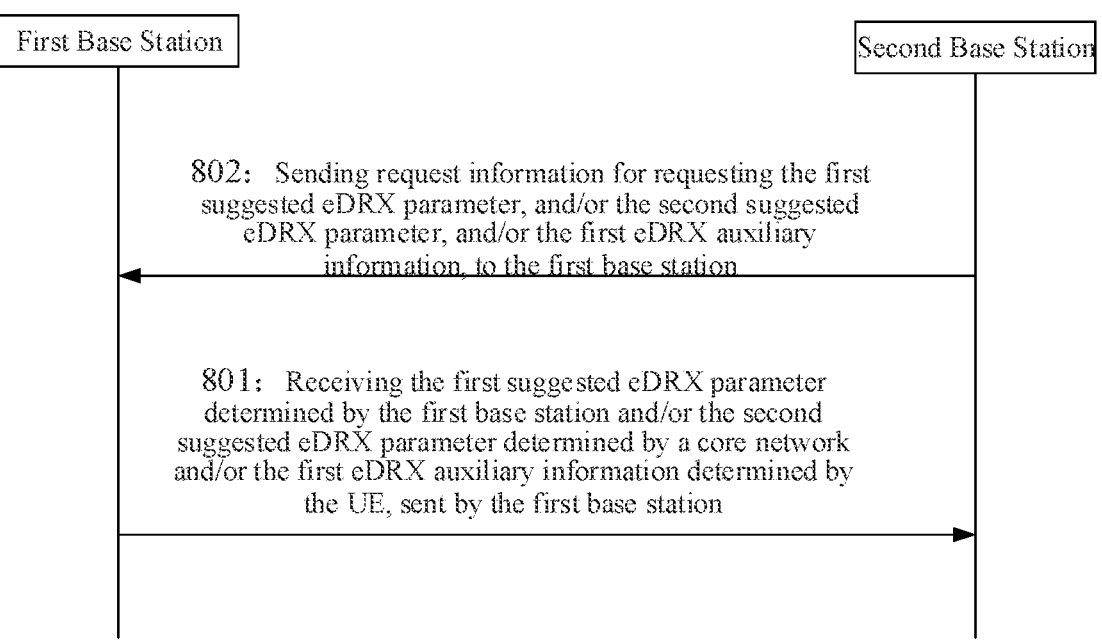
FIG. 9 is a schematic flowchart of still another method for determining an extended discontinuous reception (eDRX) parameter according to an exemplary embodiment.

In one embodiment, as shown in FIG. 9, the method further includes the following.

At block 802: request information for requesting the first suggested eDRX parameter, and/or the second suggested eDRX parameter, and/or the first eDRX auxiliary information, is sent to the first base station.

When the UE changes from the first base station to the second base station, the second base station may send the request information. The changing of the UE from the first base station to the second base station may include: switching the UE from the first base station to the second base station, reselecting of the UE from the first base station to the second base station, and movement of the UE from the signal coverage area of the first base station to the signal coverage area of the second base station in the inactive state, and the like.

The first base station may, based on the stipulations of the communication protocol, when the UE changes the base station, send the first suggested eDRX parameter, and/or the second suggested eDRX parameter determined by the core network, and/or the first eDRX auxiliary information sent by the UE to the second base station.

In one embodiment, receiving a first suggested eDRX parameter determined by the first base station and/or a second suggested eDRX parameter determined by a core network and/or the first eDRX auxiliary information determined by the UE, sent by the first base station includes:

receiving RAN PAGING signaling carrying the first suggested eDRX parameter, and/or the second suggested eDRX parameter, and/or the first eDRX auxiliary information.

When the core network pages the UE through the first base station, if the UE has changed to the second base station, the first base station can forward the paging message to the second base station through the inter-base station message: RAN PAGING signaling, and the UE will be paged by the second base station. The first suggested eDRX parameter, and/or the second suggested eDRX parameter, and/or the first eDRX auxiliary information may be carried in the RAN PAGING signaling. In this way, usage efficiency of the RAN PAGING signaling can be improved.

In one embodiment, the RAN PAGING signaling includes a first information element and a second information element, the first information element carries the first suggested eDRX parameter, and/or the second suggested eDRX parameter, and/or the first eDRX auxiliary information, and the second information element carries paging information for paging the UE;

or the first suggested eDRX parameter, and/or the second suggested eDRX parameter, and/or the first eDRX auxiliary information are carried in a UE-RadioPagingInfo information element of the RAN PAGING signaling.

The RAN PAGING signaling is used to carry the paging information of the UE. An information element may be newly added in the RAN PAGING signaling, to carry the first suggested eDRX parameter, and/or the second suggested eDRX parameter, and/or the first eDRX auxiliary information.

The first suggested eDRX parameter, and/or the second suggested eDRX parameter, and/or the first eDRX auxiliary information may also be carried in a UE-RadioPagingInfo information element of the RAN PAGING signaling.

A specific example will be provided below in combination with any of the above-mentioned embodiments.

1. Protecting a working mode of using eDRX in the inactive state, that is, the terminal determines eDRX parameter configuration on the RAN side used in the inactive state according to the eDRX parameter determined by the core network and/or the eDRX parameter determined by the base station, and these parameters are used for use of the UE upon receiving RAN gaging messages in the inactive state.

a) eDRX cycle.

b) PTW window length.

2. Based on 1, the air interface can add auxiliary information (RRC signaling mode or MAC CE mode) that the UE expects to use eDRX in the inactive state for the reference of the base station to determine the eDRX parameter configuration on the RAN side in the inactive state.

a) Does the UE support use of eDRX mechanism in the inactive state?

b) Does the UE want to use the eDRX mechanism in the inactive state?

c) The eDRX parameter that the UE wishes to use in the inactive state, including:

d) eDRX cycle, PTW window length.

e) The RAN paging cycle parameter that the UE wants to use in the inactive state, which provides a reference for the RAN paging cycle for the base station.

f) As one embodiment, the UE may provide in the auxiliary information provided by the UE to the network.

3. Based on 1, the base station can also interact with the core network to acquire auxiliary information, which is used as a reference for the base station to determine the eDRX parameter configuration on the RAN side in the inactive state.

a) The eDRX cycle determined by the core network for the UE.

b) The PTW window length determined by the core network for the UE.

c) As one embodiment: the core network notifies the base station of the auxiliary information in the UE context setup message.

4. Based on 1, the base station sends eDRX parameter configuration parameters for the RAN side of the terminal in the suspension message sent to the terminal.

5. Based on 1, the terminal can determine the eDRX parameter configuration on the RAN side used in the inactive state according to the eDRX parameter determined by the core network and/or the eDRX parameter determined by the base station (for convenience for the agent to understand, there are three ways according to an and/or relationship).

a) As one embodiment, the base station can use dedicated signaling or broadcast signaling to notify the terminal which mode is supported, or pre-agreed in a protocol.

6. Based on 1, the terminal uniformly determines the eDRX parameter used by the UE to receive RAN gaging messages in the inactive state according to the received the eDRX parameter configuration on the RAN side and/or the eDRX parameter configuration on the core network side.

a) As one embodiment: the eDRX cycle is the minimum value of the eDRX cycles of the two.

b) As one embodiment: the PTW window length is the minimum value of the PTW window lengths of the two.

The above is the operation when both are provided at the same time. If the base station does not determine the eDRX parameter configuration parameters on the RAN side for the terminal, then the terminal only determines the eDRX parameter used by the UE to receive the RAN gaging message in the inactive state according to the eDRX parameter configuration on the core network side. Or the terminal only determines the eDRX parameter used by the UE to receive RAN gaging messages in the inactive state according to the eDRX parameter configuration parameters on the RAN side.

7. Based on 1, a request indication to acquire the eDRX parameter configuration on the RAN side and/or the eDRX parameter configuration on the core network side determined by the original base station for the UE is added in the inter-base station interaction message RETRIEVE UE CONTEXT REQUEST.

a) As one embodiment, it can be explicitly indicated by a flag, and if it is 1, then it means that a request is required.

8. Based on 5, a response to the request for the eDRX parameter configuration on the RAN side and/or the eDRX parameter configuration on the core network side determined by the original base station for the UE is added in the inter-base station interaction message RETRIEVE UE CONTEXT RESPONSE.

a) As one embodiment, the eDRX parameter configuration on the RAN-side and/or the eDRX parameter configuration on the core network side determined by the UE can be added in the response to context acquisition based on the request flag in 5).

b) As one embodiment, the eDRX parameter configuration on the RAN-side and/or the eDRX parameter configuration on the core network side determined by the UE can be added in the response to context acquisition based on pre-agreed stipulation.

c) As one embodiment, the UE Radio Capability for Paging IE is added in the RETRIEVE UE CONTEXT REQUEST to carry the eDRX parameter on the RAN-side and/or the eDRX parameter configuration on the core network side determined by the UE.

9. Based on 1, the eDRX parameter configuration on the RAN-side and/or the eDRX parameter configuration on the core network side determined by the UE are/is added in the inter-base station interaction message RAN PAGING.

a) As one embodiment, the eDRX parameter configuration on the RAN side and/or the eDRX parameter configuration on the core network side determined by the UE may be carried by newly adding one IE in the message.

b) As one embodiment, the original UE-RadioPagingInfo may be extended by the eDRX parameter configuration on the RAN side and/or the eDRX parameter configuration on the core network side determined by the UE to carry this information.

Figure 10:
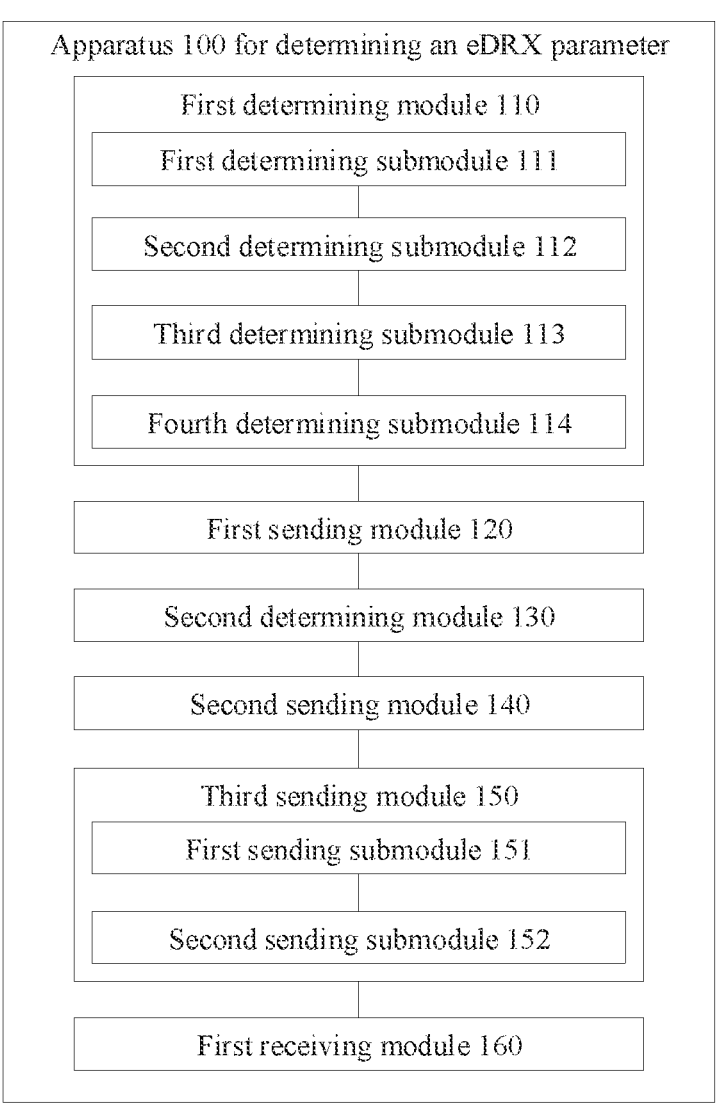
FIG. 10 is a block diagram of an apparatus for determining an extended discontinuous reception (eDRX) parameter according to an exemplary embodiment.

An embodiment of the present invention further provides an apparatus for determining an extended discontinuous reception (eDRX) parameter, which is applied in a first base station for wireless communication. As shown in FIG. 10, the apparatus 100 for determining an extended discontinuous reception (eDRX) parameter includes: a first determining module 110.

The first determining module 110 is configured to determine a first target eDRX parameter in an access network for a UE being in an inactive state based on a first suggested eDRX parameter determined by the first base station and/or a second suggested eDRX parameter determined by a core network.

In one embodiment, the first determining module 110 includes:

a first determining submodule 111 configured to determine the first target eDRX parameter based on the first suggested eDRX parameter and/or the second suggested eDRX parameter and using a determination rule.

In one embodiment, the apparatus 110 further includes:

a first sending module 120 configured to send the determination rule to the UE.

In one embodiment, the determination rule is stipulated by a communication protocol, or the determination rule is determined by the first base station.

In one embodiment, the first determining module 110 includes one of the followings:

a second determining submodule 112 configured to determine a smaller value of the first suggested eDRX parameter and the second suggested eDRX parameter as the first target eDRX parameter in response to determining the first target eDRX parameter based on the first suggested eDRX parameter and the second suggested eDRX parameter;

a third determining submodule 113 configured to determine the first suggested eDRX parameter as the first target eDRX parameter in response to determining the first target eDRX parameter based on the first suggested eDRX parameter;

a fourth determining submodule 114 configured to determine the second suggested eDRX parameter as the first target eDRX parameter in response to determining the first target eDRX parameter based on the second suggested eDRX parameter.

In one embodiment, the apparatus 100 further includes:

a second determining module 130 configured to determine the first suggested eDRX parameter based on first eDRX auxiliary information sent by the UE, and/or based on second eDRX auxiliary information sent by the core network.

In one embodiment, the first eDRX auxiliary information includes at least one of the followings:

indication information indicating whether the UE supports to perform eDRX in the inactive state;

indication information indicating whether the UE allows to perform the eDRX in the inactive state;

an auxiliary eDRX parameter of the UE;

an auxiliary parameter determined by the UE for determining a radio access network (RAN) paging cycle.

In one embodiment, the second eDRX auxiliary information includes: an auxiliary eDRX parameter of the core network.

In one embodiment, the apparatus 100 further includes:

a second sending module 140 configured to send the first suggested eDRX parameter to the UE, the first suggested eDRX parameter is used for the UE to determine a second target eDRX parameter in the access network for the UE being in the inactive state.

In one embodiment, the apparatus 100 further includes:

a third sending module 150 configured to send the first suggested eDRX parameter, and/or the second suggested eDRX parameter determined by the core network, and/or the first eDRX auxiliary information sent by the UE to a second base station.

In one embodiment, the apparatus 100 further includes:

a first receiving module 160 configured to receive request information for requesting the first suggested eDRX parameter, and/or the second suggested eDRX parameter, and/or the first eDRX auxiliary information, which is sent by the second base station;

the third sending module 150 includes:

a first sending submodule 151 configured to send the first suggested eDRX parameter, and/or the second suggested eDRX parameter, and/or the first eDRX auxiliary information to the second base station in response to receiving the request information.

In one embodiment, the third sending module 150 includes:

a second sending submodule 152 configured to send RAN PAGING signaling carrying the first suggested eDRX parameter, and/or the second suggested eDRX parameter, and/or the first eDRX auxiliary information to the second base station.

Figure 11:
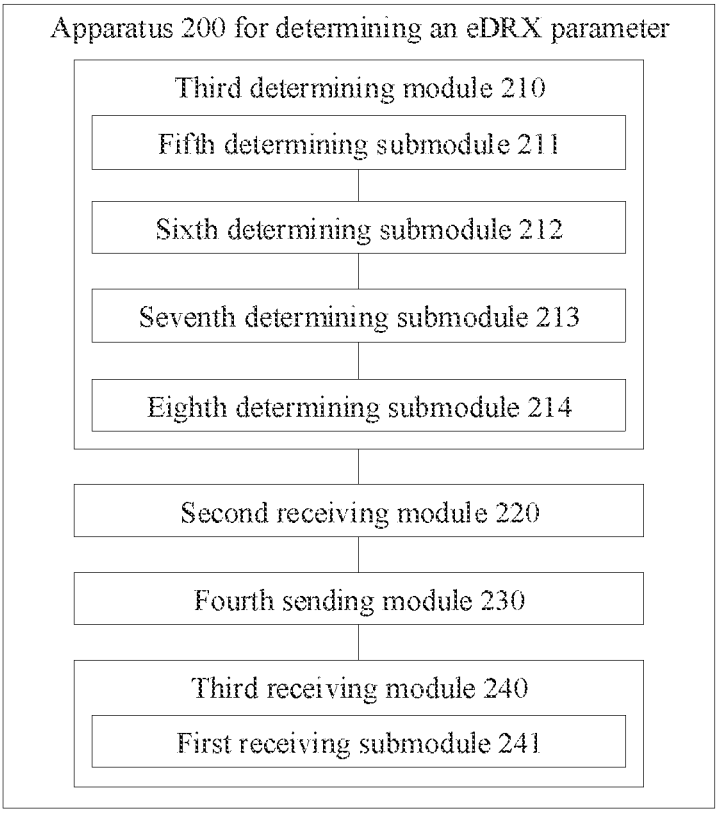
FIG. 11 is a block diagram of another apparatus for determining an extended discontinuous reception (eDRX) parameter according to an exemplary embodiment.

An embodiment of the present invention further provides an apparatus for determining an extended discontinuous reception (eDRX) parameter, which is applied in a user equipment UE for wireless communication. As shown in FIG. 11, the apparatus 200 for determining an extended discontinuous reception (eDRX) parameter includes: a third determining module 210.

The third determining module 210 is configured to determine a second target eDRX parameter in an access network for the UE being in an inactive state based on a first suggested eDRX parameter determined by a first base station and/or a second suggested eDRX parameter determined by a core network.

In one embodiment, the third determining module 210 includes:

a fifth determining submodule 211 configured to determine the second target eDRX parameter based on the first suggested eDRX and/or the second suggested eDRX parameter and using a determination rule.

In one embodiment, the apparatus 200 further includes:

a second receiving module 220 configured to receive the determination rule sent by the base station.

In one embodiment, the determination rule is stipulated by a communication protocol, or the determination rule is determined by the first base station.

In one embodiment, the third determining module 210 includes one of the followings:

a sixth determining submodule 212 configured to determine a smaller value of the first suggested eDRX parameter and the second suggested eDRX parameter as the second target eDRX parameter in response to determining the second target eDRX parameter based on the first suggested eDRX parameter and the second suggested eDRX parameter;

a seventh determining submodule 213 configured to determine the first suggested eDRX parameter as the second target eDRX parameter in response to determining the second target eDRX parameter based on the first suggested eDRX parameter;

an eighth determining submodule 214 configured to determine the second suggested eDRX parameter as the second target eDRX parameter in response to determining the second target eDRX parameter based on the second suggested eDRX parameter.

In one embodiment, the apparatus 200 further includes:

a fourth sending module 230 configured to send first eDRX auxiliary information, the first eDRX auxiliary information is used for the first base station to determine the first suggested eDRX parameter.

In one embodiment, the first eDRX auxiliary information includes at least one of the followings:

indication information indicating whether the UE supports to perform eDRX in the inactive state;

indication information indicating whether the UE allows to perform the eDRX in the inactive state;

an auxiliary eDRX parameter of the UE;

an auxiliary parameter determined by the UE for determining a radio access network (RAN) paging cycle.

In one embodiment, the apparatus 200 further includes:

a third receiving module 240 configured to receive the first suggested eDRX parameter sent by the first base station.

Figure 12:
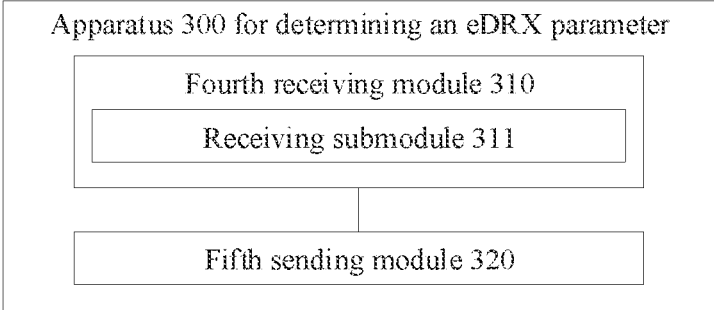
FIG. 12 is a block diagram of yet another apparatus for determining an extended discontinuous reception (eDRX) parameter according to an exemplary embodiment.

An embodiment of the present invention further provide an apparatus for determining an extended discontinuous reception (eDRX) parameter, which is applied in a second base station for wireless communication. As shown in FIG. 12, the apparatus 300 for determining an extended discontinuous reception (eDRX) parameter includes: a fourth receiving module 310.

The fourth receiving module 310 is configured to receive a first suggested eDRX parameter determined by a first base station, and/or a second suggested eDRX parameter determined by a core network, and/or first eDRX auxiliary information determined by a UE, sent by the first base station.

In one embodiment, the apparatus 300 further includes:

a fifth sending module 320 configured to send request information for requesting the first suggested eDRX parameter, and/or the second suggested eDRX parameter, and/or the first eDRX auxiliary information, to the first base station.

In one embodiment, the fourth receiving module 310 includes:

a receiving submodule 311 configured to receive RAN PAGING signaling carrying the first suggested eDRX parameter, and/or the second suggested eDRX parameter, and/or the first eDRX auxiliary information.

In an exemplary embodiment, the first determining module 110, the first sending module 120, the second determining module 130, the second sending module 140, the third sending module 150, the first receiving module 160, the third determining module 210, the second receiving module 220, the fourth sending module 230, the third receiving module 240, the fourth receiving module 310 and the fifth sending module 320, and the like, may be implemented by one or more Central Processing Unit (CPU), Graphics Processing Unit (GPU), baseband processor (BP), Application Specific Integrated Circuit (ASIC), DSP, Programmable Logic Device (PLD), Complex Programmable Logic Device (CPLD), Field Programmable Gate Array (FPGA), general processor, controller, Micro Controller Unit (MCU), Microprocessor or other electronic elements to execute the foregoing methods.

Figure 13:
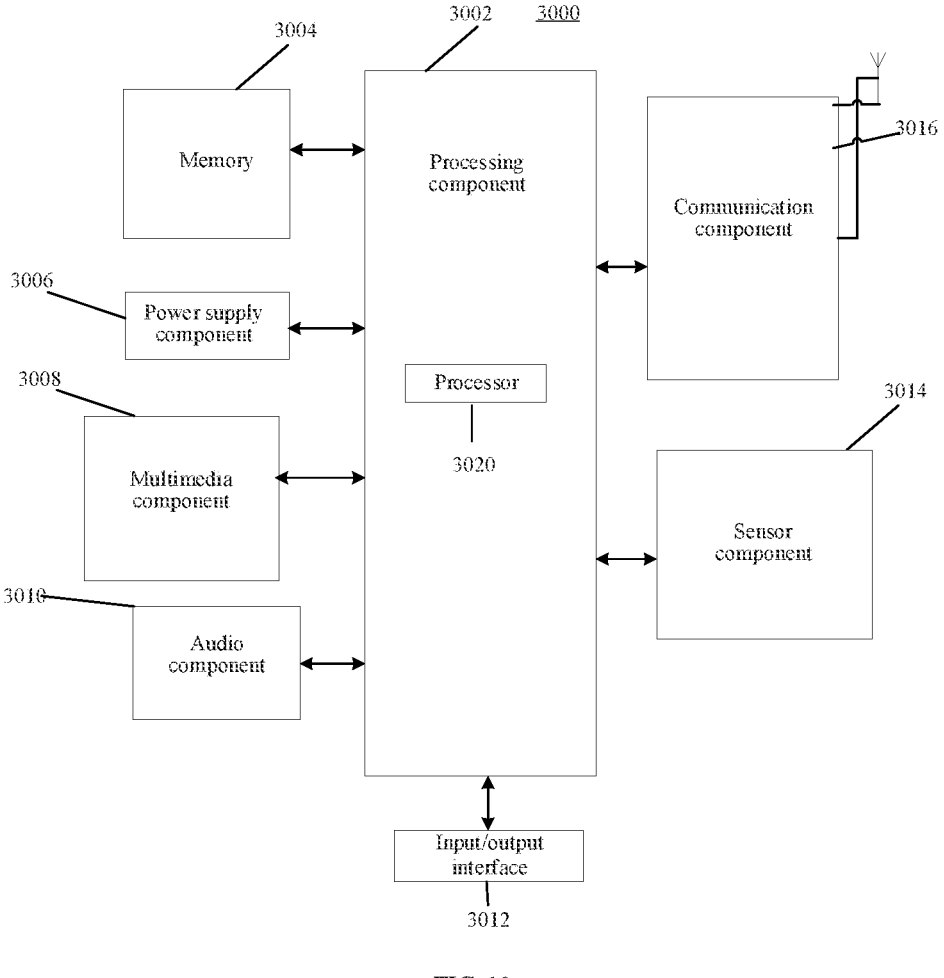
FIG. 13 is a block diagram of an apparatus for an extended discontinuous reception (eDRX) parameter according to an exemplary embodiment.

FIG. 13 is a block diagram of an apparatus 3000 for determining an extended discontinuous reception (eDRX) parameter according to an exemplary embodiment. For example, the apparatus 3000 may be a mobile phone, a computer, a digital broadcast terminal, a messaging device, a game console, a tablet device, a medical device, a fitness device, a personal digital assistant, and the like.

Referring to FIG. 13, the apparatus 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operations of the apparatus 3000, such as operations associated with displaying, phone calling, data communications, camera operations, and recording operations. The processing component 3002 may include one or more processors 3020 to execute instructions to complete all or part of the steps of the above-described method. Additionally, the processing component 3002 may include one or more modules that facilitate interaction between the processing component 3002 and other components. For example, the processing component 3002 may include a multimedia module to facilitate interaction between the multimedia component 3008 and the processing component 3002.

The memory 3004 is configured to store various types of data to support operations at the apparatus 3000. Examples of such data include instructions for any application or method operating on the apparatus 3000, contact data, phonebook data, messages, pictures, videos, and the like. The memory 3004 may be implemented by any type of volatile or non volatile storage devices or their combination, such as static random access memory (SRAM), electrically erasable programmable read-only memory (EEPROM), erasable Programmable Read Only Memory (EPROM), Programmable Read Only Memory (PROM), Read Only Memory (ROM), magnetic memory, flash memory, magnetic disk or optical disk.

The power supply component 3006 provides power to various components of the apparatus 3000. The power supply components 3006 may include a power supply management system, one or more power supplies, and other components associated with generation, management, and distribution power for the apparatus 3000.

The multimedia component 3008 includes a screen that provides an output interface between the apparatus 3000 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or swipe action, but also detect duration and pressure associated with the touch or swipe operation. In some embodiments, the multimedia component 3008 includes a front camera and/or a rear camera. When the apparatus 3000 is in an operation mode, such as a shooting mode or a video mode, the front camera and/or the rear camera can receive external multimedia data. Each of the front camera and the rear camera may be a fixed optical lens system or have focal length and optical zoom capability.

The audio component 3010 is configured to output and/or input audio signals. For example, the audio component 3010 includes a microphone (MIC), which is configured to receive external audio signals when the apparatus 3000 is in an operation mode, such as a calling mode, a recording mode and a voice recognition mode. Received audio signals may be further stored in the memory 3004 or sent via the communication component 3016, In some embodiments, the audio c 3010 also includes a speaker for outputting audio signals.

The I/O interface 3012 provides an interface between the processing component 3002 and a peripheral interface module, which may be a keyboard, a click wheel, a button, and the like. These buttons may include, but are not limited to: a home button, a volume button, a start button, and a lock button.

The sensor component 3014 includes one or more sensors for providing various aspects of status assessments for the apparatus 3000. For example, the sensor component 3014 can detect the on/off state of the apparatus 3000, the relative positioning of the components, for example, the components are the display and the keypad of the apparatus 3000, the sensor component 3014 can also detect changes in position of the apparatus 3000 or one of the components of the apparatus 3000, presence or absence of contact of the user with the apparatus 3000, orientation or acceleration/deceleration of the apparatus 3000 and temperature changes of the apparatus 3000. The sensor component 3014 may include a proximity sensor configured to detect the presence of nearby objects in the absence of any physical contact. The sensor component 3014 may further include optical sensors, such as CMOS or CCD image sensors, for use in imaging applications. In some embodiments, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and other devices. The apparatus 3000 can access a wireless network based on communication standards, such as 2G or 3G, or a combination thereof. In an exemplary embodiment, the communication component 3016 receives broadcast signals or broadcast related information from an external broadcast management system via a broadcast channel. In an exemplary embodiment, the communication component 3016 further includes a near field communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology and other technologies.

In an exemplary embodiment, the apparatus 3000 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors or other electronic elements, and configured to execute the above-described methods.

In an exemplary embodiment, a non-transitory computer-readable storage medium including instructions is further provided, such as the memory 3004 including instructions, and the above instructions can be executed by the processor 3020 of the apparatus 3000 to complete the above-described methods. For example, the non-transitory computer readable storage medium may be a ROM, a random-access memory (RAM), a CD-ROM, a magnetic tape, a floppy disk, an optical data storage device, and the like.

Other implementations of the embodiments of the invention will readily occur to those skilled in the art after consideration of the specification and practice of the invention disclosed herein. The present application is intended to cover any modification, use or adaptive change of the embodiments of the invention, and these modifications, uses or adaptive changes follow the general principles of the embodiments of the invention and include common knowledge or commonly used technical means in the technical field, which are not disclosed in the embodiments of the invention. The specification and the embodiments are to be considered exemplary only, with the true scope and the spirit of the embodiments of the invention being indicated by the following claims.

It should be understood that the embodiments of the invention are not limited to the precise constructions which have been described above and shown in the accompanying drawings, and various modifications and changes may be made without departing from the scope thereof. The scope of the embodiments of the invention is limited only by the appended claims.

What is claimed is:

1. A method for determining an extended discontinuous reception (eDRX) parameter, performed by a first base station and comprising:

determining a first target eDRX parameter in an access network for a user equipment (UE) being in an inactive state based on a first eDRX parameter determined by the first base station and a second eDRX parameter determined by a core network;

wherein determining the first target eDRX parameter in the access network for the UE being in the inactive state comprises:

determining the first target eDRX parameter based on the first eDRX parameter and the second eDRX parameter and using a determination rule;

wherein the first eDRX parameter comprises at least an eDRX cycle determined by the first base station;

the second eDRX parameter comprises an eDRX cycle and a paging time window (PTW) determined by the core network;

wherein determining the first target eDRX parameter based on the first eDRX parameter and the second eDRX parameter comprises:

determining an eDRX cycle of the first target eDRX parameter based on the eDRX cycle determined by the first base station and the eDRX cycle determined by the core network; and determining a PTW of the first target eDRX parameter based on the PTW determined by the core network.

2. The method according to claim 1, wherein determining the first target eDRX parameter in the access network for the UE being in the inactive state comprises one of:

determining a smaller value of the first eDRX parameter and the second eDRX parameter as the first target eDRX parameter;

determining the first eDRX parameter as the first target eDRX parameter; and determining the second eDRX parameter as the first target eDRX parameter.

3. The method according to claim 1, further comprising:

determining the first eDRX parameter based on at least one of first eDRX auxiliary information sent by the UE or second eDRX auxiliary information sent by the core network.

4. The method according to claim 3, wherein the first eDRX auxiliary information comprises at least one of:

indication information indicating whether the UE supports to perform eDRX in the inactive state;

indication information indicating whether the UE allows to perform eDRX in the inactive state;

an auxiliary eDRX parameter of the UE; or an auxiliary parameter determined by the UE for determining a radio access network (RAN) paging cycle.

5. The method according to claim 3, wherein the second eDRX auxiliary information comprises: an auxiliary eDRX parameter of the core network.

6. The method according to claim 3, further comprising:

sending the first eDRX parameter and the second eDRX parameter determined by the core network, or the first eDRX auxiliary information sent by the UE to a second base station.

7. The method according to claim 6, further comprising:

receiving request information sent by the second base station for requesting the first eDRX parameter and the second eDRX parameter, or the first eDRX auxiliary information;

wherein sending the first eDRX parameter and the second eDRX parameter, or the first eDRX auxiliary information to the second base station comprises:

sending the first eDRX parameter and the second eDRX parameter, or the first eDRX auxiliary information to the second base station in response to receiving the request information.

8. The method according to claim 6, wherein sending the first eDRX parameter the second eDRX parameter, or the first eDRX auxiliary information to the second base station comprises:

sending RAN PAGING signaling carrying the first eDRX parameter and the second eDRX parameter, or the first eDRX auxiliary information to the second base station.

9. The method according to claim 1, further comprising:

sending the first eDRX parameter to the UE, wherein the first eDRX parameter is used for the UE to determine a second target eDRX parameter in the access network for the UE being in the inactive state.

10. A method for determining an extended discontinuous reception (eDRX) parameter, performed by a user equipment (UE) and comprising:

determining a second target eDRX parameter in an access network for the UE being in an inactive state based on a first eDRX parameter determined by a first base station and a second eDRX parameter determined by a core network;

wherein determining the second target eDRX parameter in the access network for the UE being in the inactive state comprises:

determining the second target eDRX parameter based on the first eDRX parameter and the second eDRX parameter and using a determination rule;

wherein the first eDRX parameter comprises at least an eDRX cycle determined by the first base station;

the second eDRX parameter comprises an eDRX cycle and a paging time window (PTW) determined by the core network;

wherein determining the second target eDRX parameter based on the first eDRX parameter and the second eDRX parameter comprises:

determining an eDRX cycle of the second target eDRX parameter based on the eDRX cycle determined by the first base station and the eDRX cycle determined by the core network; and determining a PTW of the second target eDRX parameter based on the PTW determined by the core network.

11. The method according to claim 10, wherein determining the second target eDRX parameter in the access network for the UE being in the inactive state comprises one of:

determining a smaller value of the first eDRX parameter and the second eDRX parameter as the second target eDRX parameter;

determining the first eDRX parameter as the second target eDRX parameter; and determining the second eDRX parameter as the second target eDRX parameter.

12. The method according to claim 10, further comprising:

sending first eDRX auxiliary information, wherein the first eDRX auxiliary information is used for the first base station to determine the first eDRX parameter.

13. The method according to claim 12, wherein the first eDRX auxiliary information comprises at least one of:

indication information indicating whether the UE supports to perform eDRX in the inactive state;

indication information indicating whether the UE allows to perform eDRX in the inactive state;

an auxiliary eDRX parameter of the UE; or an auxiliary parameter determined by the UE for determining a radio access network (RAN) paging cycle.

14. The method according to claim 10, further comprising:

receiving the first eDRX parameter sent by the first base station.

15. A method for determining an extended discontinuous reception (eDRX) parameter, performed by a second base station and comprising:

receiving a first eDRX parameter determined by a first base station and a second eDRX parameter determined by a core network, or first eDRX auxiliary information determined by a user equipment (UE), sent by the first base station;

wherein the first eDRX parameter, the second eDRX parameter and a determination rule are used to determine a first target eDRX parameter:

wherein the first eDRX parameter comprises at least an eDRX cycle determined by the first base station, the second eDRX parameter comprises an eDRX cycle and a paging time window (PTW) determined by the core network, an eDRX cycle of the first target eDRX parameter is determined based on the eDRX cycle determined by the first base station and the eDRX cycle determined by the core network, and a PTW of the first target eDRX parameter is determined based on the PTW determined by the core network.

16. The method according to claim 15, further comprising:

sending to the first base station request information for requesting the first eDRX parameter and the second eDRX parameter, or the first eDRX auxiliary information.

17. The method according to claim 15, wherein receiving the first eDRX parameter determined by the first base station and the second eDRX parameter determined by the core network, or the first eDRX auxiliary information determined by the UE, sent by the first base station comprises:

receiving RAN PAGING signaling carrying the first eDRX parameter and the second eDRX parameter, or the first eDRX auxiliary information.

18. A communication device, comprising:

a processor; and a memory storing an executable program, wherein the processor is configured to perform the method according to claim 1.

* * * * *